United States Patent
Olgaard et al.

(10) Patent No.: US 9,497,101 B2
(45) Date of Patent: Nov. 15, 2016

(54) SYSTEM AND METHOD FOR CAPTURING AND ENABLING ANALYSIS OF TEST DATA PACKETS FROM A RADIO FREQUENCY DATA PACKET SIGNAL TRANSCEIVER

(71) Applicant: LITEPOINT CORPORATION, Sunnyvale, CA (US)

(72) Inventors: Christian Volf Olgaard, Saratoga, CA (US); Ruizu Wang, San Ramon, CA (US)

(73) Assignee: LitePoint Corporation, Sunnyvale, CA (US)

( * ) Notice: Subject to any disclaimer, the term of this patent is extended or adjusted under 35 U.S.C. 154(b) by 130 days.

(21) Appl. No.: 14/476,855

(22) Filed: Sep. 4, 2014

(65) Prior Publication Data
US 2016/0072686 A1   Mar. 10, 2016

(51) Int. Cl.
*H04L 12/26*   (2006.01)

(52) U.S. Cl.
CPC .................... *H04L 43/50* (2013.01)

(58) Field of Classification Search
CPC ....................................... H04L 43/04
See application file for complete search history.

(56) References Cited

U.S. PATENT DOCUMENTS

| | | | |
|---|---|---|---|
| 2008/0117810 A1* | 5/2008 | Stott | H04L 12/66 370/230 |
| 2011/0270561 A1 | 11/2011 | Gregg et al. | |
| 2014/0059397 A1 | 2/2014 | Barker, Jr. et al. | |
| 2015/0181583 A1* | 6/2015 | Siomina | H04W 16/14 370/330 |

FOREIGN PATENT DOCUMENTS

| | | |
|---|---|---|
| KR | 1020100037909 A | 4/2010 |
| KR | 10-1034768 B1 | 5/2011 |
| KR | 1020140001208 A | 1/2014 |

OTHER PUBLICATIONS

International Search Report and Written Opinion; filed in PCT/US2015/039662; mailed on Oct. 13, 2015; 10pgs.

* cited by examiner

*Primary Examiner* — Mohammad Anwar
(74) *Attorney, Agent, or Firm* — Banner & Witcoff, Ltd.

(57) ABSTRACT

System and method for capturing and enabling analysis of one or more test data packets from a radio frequency (RF) data packet signal transmitter device under test (DUT). Recently captured data packets from a received RF data packet signal are retained for analysis following confirmation that they contain potentially valid test data packets. Such confirmation is achieved by confirming that a data pattern defined by currently captured data packets differs from a data pattern defined by subsequently received data packets. Following such confirmation, a trigger signal initiates access and/or analysis of the captured data packets.

18 Claims, 6 Drawing Sheets

SYSTEM AND METHOD FOR CAPTURING AND ENABLING ANALYSIS OF TEST DATA PACKETS FROM A RADIO FREQUENCY DATA PACKET SIGNAL TRANSCEIVER

BACKGROUND

The present invention relates to testing a radio frequency (RF) data packet signal transceiver device under test (DUT), and in particular, enabling analysis of previously received and captured test data packets following detected changes in received signal characteristics while the DUT continues to transmit further data packets.

Many of today's electronic devices use wireless technologies for both connectivity and communications purposes. Because wireless devices transmit and receive electromagnetic energy, and because two or more wireless devices have the potential of interfering with the operations of one another by virtue of their signal frequencies and power spectral densities, these devices and their wireless technologies must adhere to various wireless technology standard specifications.

When designing such wireless devices, engineers take extra care to ensure that such devices will meet or exceed each of their included wireless technology prescribed standard-based specifications. Furthermore, when these devices are later being manufactured in quantity, they are tested to ensure that manufacturing defects will not cause improper operation, including their adherence to the included wireless technology standard-based specifications.

For testing these devices following their manufacture and assembly, current wireless device test systems employ a subsystem for analyzing signals received from each device. Such subsystems typically include at least a RF data packet signal transmitter, such as a vector signal generator (VSG), for providing the source signals to be transmitted to the device under test, and a RF data packet signal receiver, such as a vector signal analyzer (VSA), for receiving and analyzing signals produced by the DUT. The production of test signals by the VSG and signal analysis performed by the VSA are generally programmable so as to allow each to be used for testing a variety of devices for adherence to a variety of wireless technology standards with differing frequency ranges, bandwidths and signal modulation characteristics.

When testing such devices, triggering is often used to initiate action on a subsequent test event. For example, in advance of a test packet to be sent (e.g., by the DUT to the tester), a trigger would alert the tester to prepare for it. However, this necessarily requires that the tester know ahead in time when to capture one or more portions of a sequence of data packets being transmitted, as well as when to initiate testing (e.g., analysis) of the captured data packets. Further complicating this approach is the tendency for semiconductor integrated circuits (ICs) to intersperse non-deterministic self-calibration in the midst of a sequence of test data packets being sent. Capturing and analyzing such events (e.g., sequences of self-calibration data packets) provides little to no test data of value and is often cause for a test-error report.

Triggering often occurs in response to changes in one or more signal characteristics, following which action is taken on a following event. This means the device or system under test must know when the correct time is to respond and begin capturing packets. In many chipsets, some level of non-deterministic self-calibration is employed, which may be erroneously seen as an event to which the proper response is to begin capturing packets. Hence, it is necessary to detect these intervals of self-calibration and, once they have been completed, then begin processing (e.g., capturing or counting) packets.

SUMMARY

In accordance with the presently claimed invention, a system and method are provided for capturing and enabling analysis of one or more test data packets from a radio frequency (RF) data packet signal transmitter device under test (DUT). Recently captured data packets from a received RF data packet signal are retained for analysis following confirmation that they contain potentially valid test data packets. Such confirmation is achieved by confirming that In accordance with one embodiment of the presently claimed invention, a system for capturing and enabling analysis of a plurality of test data packets from a radio frequency (RF) data packet signal transmitter device under test (DUT), including:

data packet capture circuitry responsive to reception of a RF data packet signal, which includes at least one data packet sequence with a plurality of first data packets having respective first packet durations mutually separated by respective first inter-packet intervals, by capturing at least one of said plurality of first data packets and asserting a trigger signal when said plurality of first data packets includes a repeated first data packet pattern defined by at least said first packet durations and inter-packet intervals, and said RF data packet signal further includes, subsequent to said plurality of first data packets, a time interval different from said first inter-packet intervals and having no data packet, or a plurality of second data packets having respective second packet durations mutually separated by respective second inter-packet intervals, wherein said second packet durations and inter-packet intervals define a second data packet pattern different from said first data packet pattern; and data packet analysis circuitry coupled to said data packet capture circuitry and responsive to said asserted trigger signal by analyzing said captured at least one of said plurality of first data packets.

In accordance with another embodiment of the presently claimed invention, a method for capturing and enabling analysis of a plurality of test data packets from a radio frequency (RF) data packet signal transmitter device under test (DUT), including:

responding to reception of a RF data packet signal, which includes at least one data packet sequence with a plurality of first data packets having respective first packet durations mutually separated by respective first inter-packet intervals, by capturing at least one of said plurality of first data packets and asserting a trigger signal when said plurality of first data packets includes a repeated first data packet pattern defined by at least said first packet durations and inter-packet intervals, and said RF data packet signal further includes, subsequent to said plurality of first data packets, a time interval different from said first inter-packet intervals and having no data packet, or a plurality of second data packets having respective second packet durations mutually separated by respective second inter-packet intervals, wherein said second packet durations and inter-packet intervals define a second data packet pattern different from said first data packet pattern; and responding to said asserted trigger signal by analyzing said captured at least one of said plurality of first data packets.

DETAILED DESCRIPTION

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components, which are either active and/or passive and are connected or otherwise coupled together (e.g., as one or more integrated circuit chips) to provide the described function. Additionally, the term "signal" may refer to one or more currents, one or more voltages, or a data signal. Within the drawings, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed. Moreover, to the extent that the figures illustrate diagrams of the functional blocks of various embodiments, the functional blocks are not necessarily indicative of the division between hardware circuitry.

When a DUT is engaged in a TX test with a tester (during which the tester is receiving and capturing data packets from the DUT for analysis), the DUT will send one or a sequence of test packets to the tester. Ordinarily, the tester would need to know when to expect the transmission of packets that are suitable for testing, and a trigger (e.g., from the DUT or another source such as an external controller) would precede the transmission, thus preparing the tester to capture the packet sequence that follows. As discussed in more detail below, in accordance with exemplary embodiments of the presently claimed invention, the trigger follows rather than precedes a packet sequence transmission, and the occurrence of the trigger depends upon the system knowing the characteristics (e.g., pattern(s)) of transmitted data packet signals. A benefit of this approach is avoidance of erroneous detections that can occur at the beginning of a packet sequence, following which subsequent packet capturing and other packet processing becomes offset in time. For example, if a self-calibration procedure is initiated and executed near the beginning of a packet sequence, a non-deterministic number of packets may be transmitted, thereby making it difficult to identify the desired packets to be captured or processed. Alternatively or additionally, the nominal power level of the packet sequence may not have settled, thereby making it difficult to capture desired packets among fluctuating packet power levels. However, in accordance with the presently claimed invention, the end of a packet sequence, which is well defined and not dependent on initial packet sequence conditions, can be advantageously used to trigger packet capturing and processing.

As discussed in more detail below, in accordance with exemplary embodiments of the presently claimed invention, to enable the tester to avoid capturing non-test-related events, such as self-calibration, and avoid capturing packets with excessively variable power levels, triggering is used to prompt the tester to capture and analyze past events rather than future events. Incoming test packets are captured and retained in memory such that at any moment there will be some number of most recent packets, previously sent and temporarily stored in that memory. The memory serves as a buffer to provide, in effect, a rolling window of a previously sent number of packets determined by the chosen memory capacity.

Figure 1:
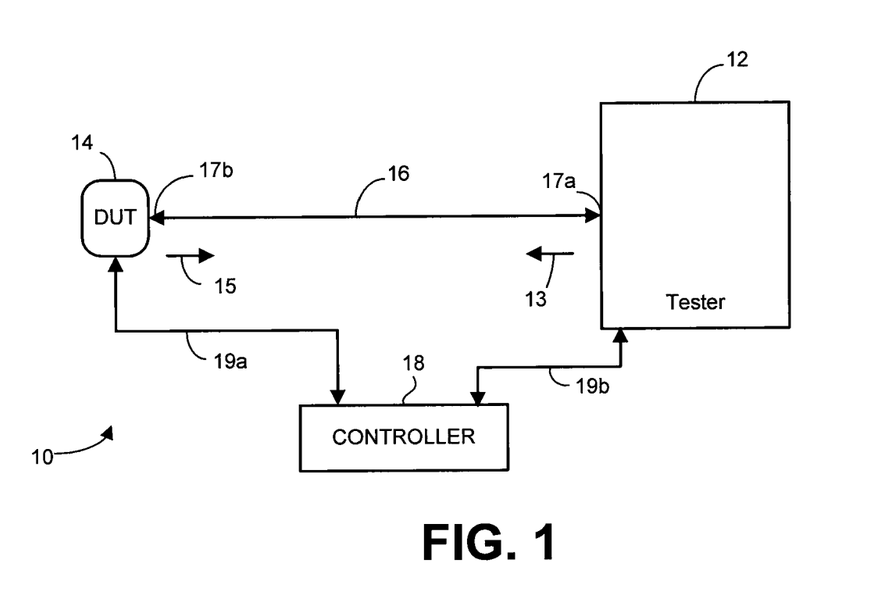
FIG. 1 depicts a typical testing environment for a RF data packet signal transceiver.

Referring to FIG. 1, in accordance with exemplary embodiments of the presently claimed invention, the testing environment 10 includes a tester 12 (e.g., including a VSG and VSA, as discussed above), the DUT 14 and a controller 18, all interconnected substantially as shown. The controller 18 exchanges test commands and data via a control signal interface 19a between the controller 18 and DUT 14, and a control signal interface 19b between the controller 18 and tester 12. The controller 18 can be external to and separate from the tester 12 and DUT 14, as depicted here, or, alternatively, can be included, in part or in whole, within the tester 12.

The test signal interface 16 between the tester 12 and DUT 14 is typically a conductive signal path, such as a RF coaxial cable and connectors 17a, 17b, or, alternatively, a wireless signal path 16 serving as the communication medium between antennas 17a, 17b associated with the tester 12 and DUT 14. In accordance with well-known principles, this signal path 16 is used to convey data packet signals 13, 15 originating from the tester 12 and DUT 14.

Figure 2:
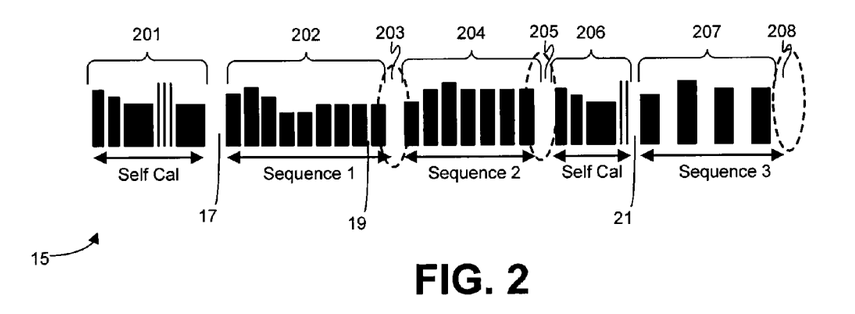
FIG. 2 depicts exemplary sequences of sequential data packets transmitted by a DUT for analysis by a tester in accordance with exemplary embodiments of the presently claimed invention.

Referring to FIG. 2, during transmit (TX) signal testing of the DUT 14, multiple sequential data packet sequences 201, 202, 204, 206, 207, . . . are transmitted by the DUT 14 as the TX signal 15 for reception and analysis by the tester 12. These data packet sequences often include self-calibration sequences 201, 206 and test data packet sequences 202, 204, 207, and include packets having respective packet durations mutually separated by respective inter-packet intervals 19. These packet sequences 201, 202, 204, 206, 207, . . . are further mutually separated by inter-sequence intervals 17, 203, 205, 21, 208, . . . . The test data packet sequences 202, 204, 207 can be at the same frequency (or channel) or at different frequencies. Self-calibration sequences 201, 206 can occur following various signal events, including, without limitation, transmission of a predetermined number of TX data packets, changes in TX signal frequency or power, or timed events.

As depicted here for this exemplary sequence of data packets, somewhere within this series of sequential data packet sequences, self-calibration is initiated, thereby introducing a self-calibration data packet transmission 201, following which, after an inter-sequence interval 17, test data packet sequences 202, 204 (separated by another inter-sequence interval 203) are transmitted. As shown, the self-calibration data packet sequence includes data packet transmissions having varying signal characteristics, such as signal power levels and data rates, and, as understood in the art, not otherwise consistent or associated with data packets expected to be received by the particular DUT 14 for purposes of ensuring accurate data reception.

As shown, the test data packets within these test data packet sequences 202, 204, following their preceding inter-sequence intervals 17, 203 (during which the signal transmitter circuitry is idled, e.g., turned off), initially have varying signal power levels as the newly active signal transmitter circuitry settles, following which the data packet signal levels settle at the intended nominal signal power level. The repeated packet durations and inter-packet intervals of one or both of these test data packet sequences 202, 204 together define a data packet pattern.

Following another inter-sequence time interval 205, the DUT 14 chipset may initiate and transmit another self-calibration data packet sequence 206, which includes different packet durations and/or inter-packet intervals, thereby defining another data packet pattern which differs from the pattern defined by the preceding test data packet sequences 202, 204. Further, the self-calibration data packet sequence 206 does not have a repeating pattern of packet durations and inter-packet intervals. This difference between these preceding and subsequent (e.g., adjacent) data packet patterns serves as a triggering event. Accordingly, capture and analysis of one or more of the test data packets of the preceding sequences 202, 204 are triggered.

This self-calibration data packet sequence 206 is followed by another inter-sequence interval 21 prior to the next test data packet sequence 207. However, Since the self-calibration data packet sequence 206 did not have a repeating pattern of packet durations and inter-packet intervals, the data packet pattern of the next test data packet sequence 207, is not compared to the self-calibration data packet pattern for purposes of determining whether capture and analysis of any data packets are to be triggered.

Subsequently, following the next data packet sequence 207, which does include repeated packet durations and inter-packet intervals, and the subsequent time interval 208, subsequent data packet patterns are monitored to determine whether and when further triggering events occur, thereby initiating capture and analysis of one or more preceding test data packets of this sequence 207 those that follow.

Figure 3:
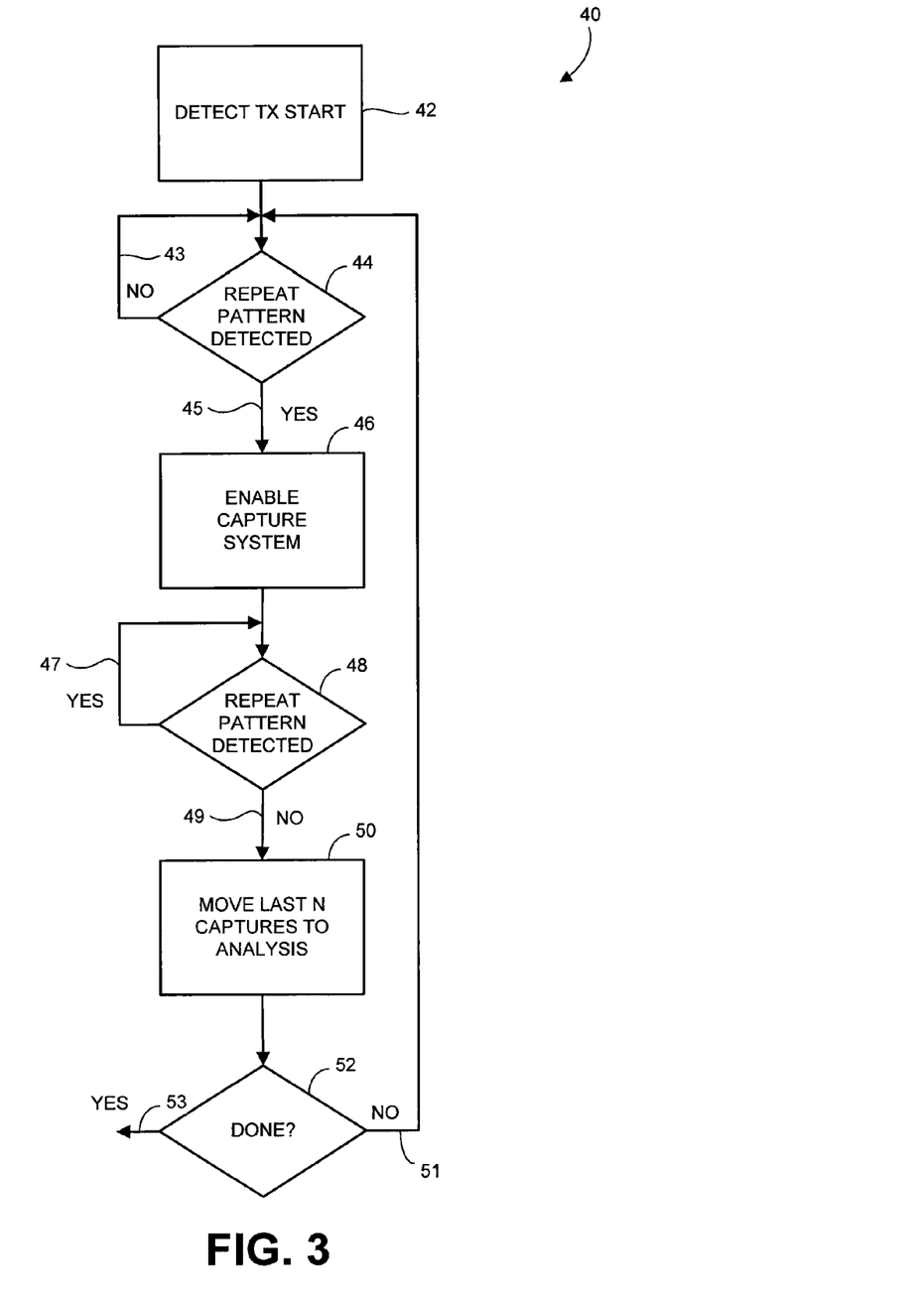
FIG. 3 depicts a test flow in accordance with exemplary embodiments of the presently claimed invention.

Referring to FIG. 3, a test flow 40 in accordance with exemplary embodiments of the presently claimed invention proceed as shown. Following detection of initiation of a TX data packet signal 42, the signal is monitored for detection of a repeated data packet pattern 44, which can be defined based on various signal characteristics, including (without limitation) data packet durations, inter-packet intervals, or packet power levels. If no repeated data packet pattern is detected 43 (e.g., as discussed above), this monitoring 44 continues until such time as a repeated data packet pattern is detected (or a timeout interval has been exceeded).

If a repeated data packet pattern is detected 45, then capturing of the incoming data packets is enabled 46. As incoming data packets are captured, they continue to be monitored for the repeated data packet pattern 48. So long as the repeated data packet pattern continues to be detected 47, this monitoring continues. Come such time as the repeated data packet pattern is no longer detected 49, a predetermined number N of the most recently captured data packets are identified and conveyed or otherwise made accessible to appropriate resources for analysis 50. If the test is deemed completed 53, this test flow is exited. If the test is not deemed completed 51, this test flow 40 is repeated.

Hence, analysis of a predetermined number of the most recently captured data packets is ultimately initiated following either one of two events: (1) reception of one or more repeated data packet patterns followed by a time interval different from (e.g., longer than) the preceding inter-packet intervals and during which no data packet is received; or (2) reception of a data packet pattern different from the preceding repeated data packet pattern (e.g., a data packet pattern having one or more of different data packet durations, different inter-packet intervals, or different packet power levels).

Figure 4:
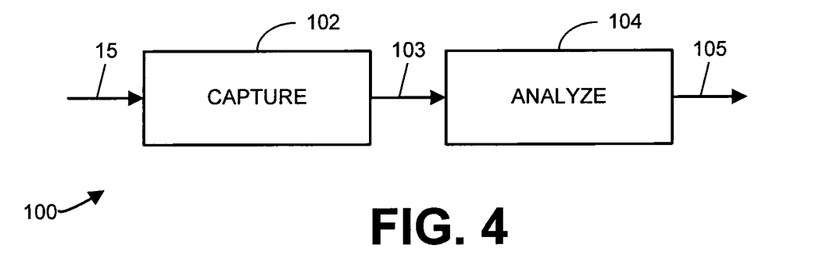
FIG. 4 depicts an exemplary embodiment of data packet capture and analysis circuitry for implementation within a tester in accordance with exemplary embodiments of the presently claimed invention.

Referring to FIG. 4, the circuitry 100 for capturing and analyzing test data packets as discussed above can be co-located within the tester 12, or, alternatively, can be located in part within the tester 12 and in part elsewhere in accordance with well-known techniques (e.g., with the data packet capture circuitry 102 located within the tester 12 and the analysis circuitry 104 located elsewhere and accessible via network communications). As discussed above, the test data packet sequence 15 is captured within data packet capture circuitry 102. Following the occurrence of a trigger, as discussed above, the designated data packets 103 are analyzed by the analysis circuitry 104 to produce test results 105.

Figure 5:
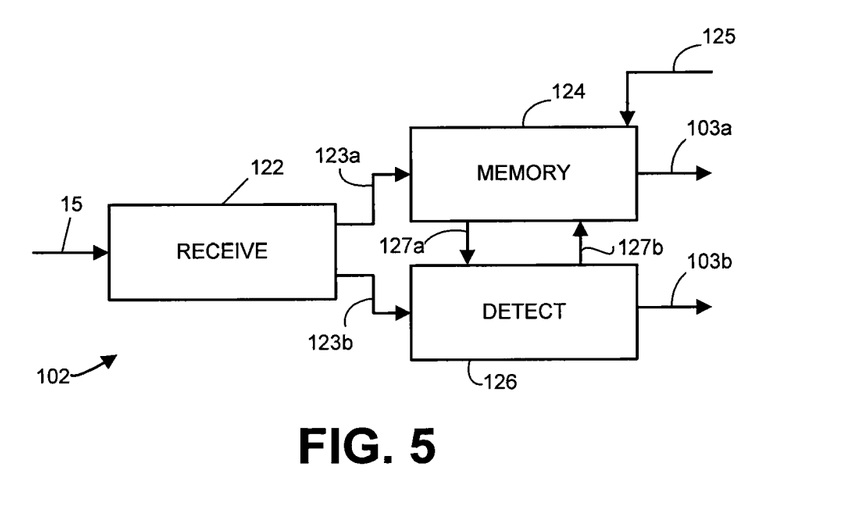
FIG. 5 depicts another exemplary embodiment of data packet capture circuitry for implementation within a tester in accordance with exemplary embodiments of the presently claimed invention.

Referring to FIG. 5, in accordance with exemplary embodiments, the capture circuitry 102 can be implemented as receive circuitry 122 capable of providing any necessary signal conversion (e.g., signal frequency down conversion, analog-to-digital signal conversion, etc.) of the data packet sequence 15 to provide digital signal data 123a for storage in memory circuitry 124. This digital signal data 123b is also monitored by detection circuitry 126 to recognize occurrences of triggering events (as discussed above). Following detection of a triggering event by the detection circuitry 126, one or more control signals 103b are provided to the analysis circuitry 104 (FIG. 3), in response to which the analysis circuitry 104 will access the predetermined number of test data packets 103a for analysis.

Alternatively, the stored data 127a is monitored by the detection circuitry 126 to detect occurrences of triggering events (as discussed above). In response to a triggering event, the detection circuitry 126 provides one or more control signals 127b to the memory circuitry 124 to provide the predetermined number of data packets 103a for processing by the analysis circuitry 104. Alternatively, the detection circuitry 126 can provide one or more control signals 103b to the analysis circuitry 104 indicating that a triggering event has been recognized, in response to which the analysis circuitry 104 can provide one or more control signals 125 to the memory circuitry 124 to access the desired number of test data packets 103a.

Figure 6:
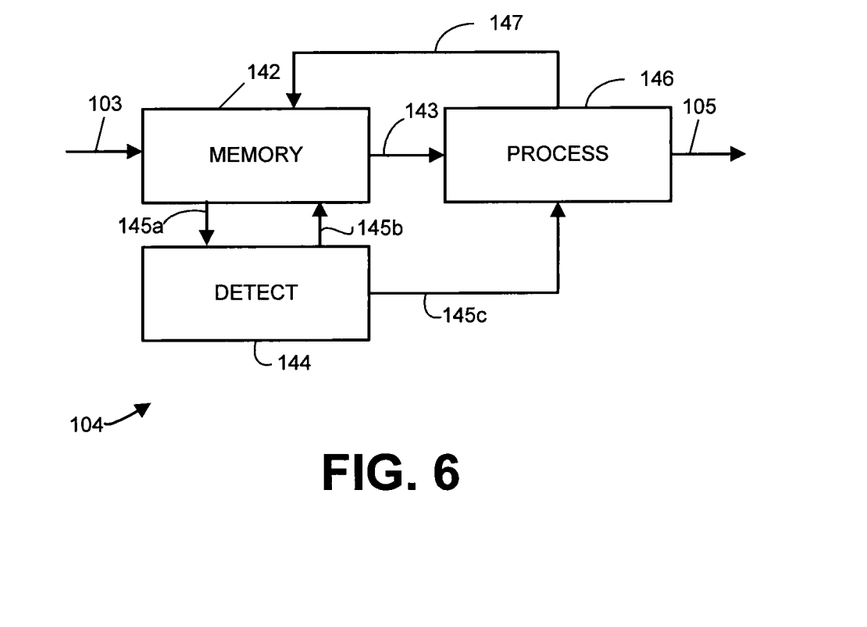
FIG. 6 depicts another exemplary embodiment of data packet analysis circuitry for implementation within a tester in accordance with exemplary embodiments of the presently claimed invention.

Referring to FIG. 6, in accordance with further exemplary embodiments, the analysis circuitry 104 can be implemented to include memory circuitry 142, detection circuitry 144 and processing circuitry 146. The capture circuitry 102 (FIG. 3) can be implemented to provide any necessary conversion of the data packet sequence 15 (e.g., signal frequency down conversion, analog-to-digital signal conversion, etc.) to provide digital signal data 103 for storage in the memory circuitry 142. This digital data 145a is monitored by the detection circuitry 144 to detect occurrences of triggering events (as discussed above). In response to a triggering event, the detection circuitry 144 provides one or more control signals 145b to the memory circuitry 142 to provide the predetermined number of data packets 143 for processing by the processing circuitry 146. Alternatively, the detection circuitry 144 can provide one or more control signals 145c to the processing circuitry 146 indicating that a triggering event has been recognized, in response to which the processing circuitry 146 can provide one or more control signals 147 to the memory circuitry 142 to access the desired number of test data packets 143.

Various other modifications and alterations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. An apparatus including a system for capturing and enabling analysis of a plurality of test data packets from a radio frequency (RF) data packet signal transmitter device under test (DUT), comprising:
    data packet capture circuitry responsive to reception of a RF data packet signal, which includes at least one data packet sequence with a plurality of first test data packets having respective first packet durations mutually separated by respective first inter-packet intervals, by capturing a predetermined number less than all of said plurality of first test data packets and asserting a trigger signal when
        said plurality of first data packets includes a repeated first test data packet pattern defined by at least said first packet durations and inter-packet intervals, and
        said RF data packet signal further includes, subsequent to said plurality of first test data packets,
            a time interval different from said first inter-packet intervals and having no test data packet, or
            a plurality of second test data packets having respective second packet durations mutually separated by respective second inter-packet intervals, wherein said second packet durations and inter-packet intervals define a second test data packet pattern different from said first test data packet pattern; and
    data packet analysis circuitry coupled to said data packet capture circuitry and responsive to said asserted trigger signal by analyzing said captured predetermined number less than all of said plurality of first test data packets.

2. The apparatus of claim 1, wherein said time interval different from said first inter-packet intervals and having no test data packet comprises a time interval different from each of said first inter-packet intervals.

3. The apparatus of claim 1, wherein said plurality of second test data packets is immediately subsequent to said plurality of first test data packets.

4. The apparatus of claim 1, wherein:
    said plurality of first test data packets have respective first packet durations and power levels mutually separated by respective first inter-packet intervals;
    said first test data packet pattern is defined by said first packet durations and power levels, and said first inter-packet intervals;
    said plurality of second test data packets have respective second packet durations and power levels mutually separated by respective second inter-packet intervals; and
    said second test data packet pattern is defined by said second packet durations and power levels, and said second inter-packet intervals.

5. The apparatus of claim 4, wherein said plurality of second test data packets is immediately subsequent to said plurality of first test data packets.

6. The apparatus of claim 1, wherein said data packet capture circuitry comprises:
    receiver circuitry responsive to said reception of said RF data packet signal by providing said at least one data packet sequence and said trigger signal; and
    memory circuitry coupled to said receiver circuitry and responsive to said at least one of said plurality of first test data packets by storing said predetermined number less than all of said plurality of first test data packets.

7. The apparatus of claim 6, wherein said data packet capture circuitry further comprises detection circuitry responsive to said at least one data packet sequence by providing said trigger signal.

8. The apparatus of claim 1, wherein said data packet analysis circuitry comprises:
    memory circuitry responsive to said at least one of said plurality of first test data packets by storing said predetermined number less than all of said plurality of first test data packets; and
    processing circuitry coupled to said memory circuitry and responsive to said asserted trigger signal by processing said stored predetermined number less than all of said plurality of first test data packets.

9. The apparatus of claim 8, wherein said data packet analysis circuitry further comprises detection circuitry responsive to said at least one data packet sequence by providing said trigger signal.

10. A method for capturing and enabling analysis of a plurality of test data packets from a radio frequency (RF) data packet signal transmitter device under test (DUT), comprising:
    responding to reception of a RF data packet signal, which includes at least one data packet sequence with a plurality of first test data packets having respective first packet durations mutually separated by respective first inter-packet intervals, by capturing predetermined number less than all of said plurality of first test data packets and asserting a trigger signal when
        said plurality of first test data packets includes a repeated first test data packet pattern defined by at least said first packet durations and inter-packet intervals, and said RF data packet signal further includes, subsequent to said plurality of first test data packets,
- a time interval different from said first inter-packet intervals and having no test data packet, or
- a plurality of second test data packets having respective second packet durations mutually separated by respective second inter-packet intervals, wherein said second packet durations and inter-packet intervals define a second test data packet pattern different from said first test data packet pattern; and responding to said asserted trigger signal by analyzing said captured predetermined number less than all of said plurality of firsts data packets.

11. The method of claim 10, wherein said time interval different from said first inter-packet intervals and having no test data packet comprises a time interval different from each of said first inter-packet intervals.

12. The method of claim 10, wherein said plurality of second test data packets is immediately subsequent to said plurality of first test data packets.

13. The method of claim 10, wherein:
said plurality of first test data packets have respective first packet durations and power levels mutually separated by respective first inter-packet intervals;
said first test data packet pattern is defined by said first packet durations and power levels, and said first inter-packet intervals;
said plurality of second test data packets have respective second packet durations and power levels mutually separated by respective second inter-packet intervals; and
said second test data packet pattern is defined by said second packet durations and power levels, and said second inter-packet intervals.

14. The method of claim 13, wherein said plurality of second test data packets is immediately subsequent to said plurality of first test data packets.

15. The method of claim 10, wherein said responding to reception of a RF data packet signal by capturing a predetermined number less than all of said plurality of first test data packets and asserting a trigger signal comprises:
responding to said reception of said RF data packet signal by providing said at least one data packet sequence and said trigger signal; and
responding to said at least one of said plurality of first test data packets by storing said predetermined number less than all of said plurality of first test data packets.

16. The method of claim 15, wherein said responding to reception of a RF data packet signal by capturing a predetermined number less than all of said plurality of first test data packets and asserting a trigger signal further comprises responding to said at least one data packet sequence by providing said trigger signal.

17. The method of claim 10, wherein said responding to said asserted trigger signal by analyzing said captured predetermined number less than all of said plurality of first test data packets comprises:
responding to said at least one of said plurality of first test data packets by storing said predetermined number less than all of said plurality of first test data packets; and
responding to said asserted trigger signal by processing said stored predetermined number less than all of said plurality of first test data packets.

18. The method of claim 17, wherein said responding to said asserted trigger signal by analyzing said captured predetermined number less than all of said plurality of first test data packets further comprises responding to said at least one data packet sequence by providing said trigger signal.

* * * * *